(12) United States Patent
Cooley et al.

(10) Patent No.: US 8,480,304 B1
(45) Date of Patent: Jul. 9, 2013

(54) BEARINGS, BEARING APPARATUS, AND SYSTEMS INCLUDING THE SAME

(75) Inventors: Craig H. Cooley, Saratoga Springs, UT (US); Timothy N. Sexton, Santaquin, UT (US)

(73) Assignee: US Synthetic Corporation, Orem, UT (US)

( * ) Notice: Subject to any disclaimer, the term of this patent is extended or adjusted under 35 U.S.C. 154(b) by 934 days.

(21) Appl. No.: 12/356,379

(22) Filed: Jan. 20, 2009

(51) Int. Cl.
*F16C 33/00* (2006.01)
*F16C 33/02* (2006.01)
*F16C 17/04* (2006.01)

(52) U.S. Cl.
USPC .............................. 384/95; 384/282; 384/420

(58) Field of Classification Search
USPC ............. 384/92, 95, 121, 123, 282, 284, 285, 384/297, 298, 420, 907.1; 175/371, 372
See application file for complete search history.

(56) References Cited

U.S. PATENT DOCUMENTS

| | | | | |
|---|---|---|---|---|
| 4,468,138 | A | * | 8/1984 | Nagel ............................ 384/303 |
| 4,560,014 | A | | 12/1985 | Geczy |
| 5,092,687 | A | | 3/1992 | Hall |
| 5,217,081 | A | * | 6/1993 | Waldenstrom et al. ..... 175/420.2 |
| 5,342,129 | A | * | 8/1994 | Dennis et al. .................. 384/420 |
| 5,364,192 | A | * | 11/1994 | Damm et al. .................. 384/420 |
| 5,499,688 | A | * | 3/1996 | Dennis ........................... 175/426 |
| 7,243,745 | B2 | * | 7/2007 | Skeem et al. ................... 175/432 |
| 7,255,480 | B2 | * | 8/2007 | John et al. ...................... 384/303 |
| 7,878,777 | B2 | * | 2/2011 | Iwanami et al. ............. 418/55.5 |

* cited by examiner

*Primary Examiner* — Thomas R Hannon
*Assistant Examiner* — Adam D Rogers
(74) *Attorney, Agent, or Firm* — Holland & Hart LLP (57) ABSTRACT

A bearing ring for use in bearing apparatuses is disclosed. Such a bearing ring may comprise a body having a first array and a second array of bearing elements mounted to the body. The body may have an annular shape and the first array and the second array may be a concentric elliptical shapes, including circles. The body may comprise a plurality of bearing element pockets into which the bearing elements are disposed. In one aspect of the instant disclosure, the material of the bearing elements comprises polycrystalline diamond. A bearing apparatus comprising a first bearing ring and a second bearing ring is also disclosed. A drilling system for use in drilling subterranean formations employing the bearing apparatus is also disclosed.

18 Claims, 5 Drawing Sheets

BEARINGS, BEARING APPARATUS, AND SYSTEMS INCLUDING THE SAME

BACKGROUND

Conventional bearing apparatus, such as thrust bearings and radial bearings, typically include one or more annular members or bearing rings, such as a rotor and a stator, and a plurality of bearing elements disposed thereon. The bearing elements may be disposed in a single circular array of pockets in each of the annular members. The array of pockets in the annular members may be concentric with the inner and outer edges of the annular member. In operation, two annular members may be aligned with their respective bearing elements facing each other, such that the bearing elements contact one another while one or both of the annular members rotate.

While conventional bearings using superhard material for the bearing elements are capable of sustaining very high loads and speeds in a variety of operating conditions, the bearings are often damaged by heat generated by the friction between bearing elements during operation. If the bearings are not designed to remove generated frictional heat, elevated bearing temperatures may result in bearing failure. For example, when the temperature of a bearing element rises above a certain threshold temperature, the bearing element may begin to degrade.

In down-hole oil and gas drilling applications, this problem has been addressed through the use of cooling fluid. Usually in the form of drilling mud, the relatively cool fluid flows around the bearing elements to cool the bearing elements. Generated frictional heat is transferred from the bearing elements to the cooling fluid by convective heat transfer. The cooling fluid carrying the heat may then be circulated away from the bearing elements. However, because the cooling fluid flows around only the surfaces of the bearing elements, a thermal gradient is created within the bearing elements. That is to say, the center of the bearing elements remain hot while the outer surfaces of the elements are cooled by the cooling fluid. The heat at the center of the bearing elements may still result in bearing failure, and therefore the use of cooling fluid alone has not fully addressed the problem of frictional heat generated by bearing elements.

One possible solution that has been previously postulated is to decrease the size of bearing elements. By reducing the distance from the hot, central portion of the bearing element to the cool, outer portions of the bearing element, the maximum bearing element temperature may be reduced. However, reducing the bearing element size also reduces the total bearing element-to-bearing element contact area of the bearing, thus increasing the pressure on the bearing elements for the same axial load.

Thus, a need exists for an improved bearing capable of reducing or eliminating the effects of frictional heat without significantly increasing the pressure on the bearing elements.

SUMMARY

The instant disclosure relates generally to bearing rings, bearing apparatus, and drilling systems including bearing apparatus. In one embodiment, the instant disclosure relates to bearing rings, bearing apparatus, and drilling systems including bearing elements comprising superhard material, such as polycrystalline diamond (PCD).

One aspect of the instant disclosure relates to a bearing ring. The bearing ring includes a body and a plurality of bearing elements. The body includes a first face and a second face opposing the first face. The plurality of bearing elements includes a first array of bearing elements and a second array of bearing elements. The first array of bearing elements is mounted to the body and has an elliptical shape. The second array of bearing elements is mounted to the body and has an elliptical shape. A size of at least one of the plurality of bearing elements may be different than a size of at least another of the plurality of bearing elements. A shape of at least one of the plurality of bearing elements may be different than a shape of at least another of the plurality of bearing elements. The elliptical shapes of the first array and the second array may be generally circular and generally concentric. In one embodiment, the elliptical shapes of the first array and the second array are circular.

Each of the bearing elements may be disposed in a bearing element pocket defined in the body. Each bearing element of the first array and each bearing element of the second array may have a generally cylindrical shape, wherein each bearing element pocket has a generally cylindrical shape with a diameter that exceeds a diameter of each bearing element disposed therein. The bearing element pockets within the first array may be circumferentially evenly spaced apart from one another and the bearing element pockets within the second array may be circumferentially evenly spaced apart from one another. Each bearing element may include a top end that extends out of the bearing element pocket into which it is disposed, wherein the top end is beveled. Each bearing element may include at least one of: polycrystalline diamond; tungsten carbide; silicon carbide; and cubic boron nitride. Further, each bearing element may include polycrystalline diamond compact.

Another aspect of the present disclosure relates to a bearing apparatus. The bearing apparatus includes a first bearing ring and a second bearing ring. Each of the first and second bearing rings includes a body, a first array of bearing elements, and a second array of bearing elements. The body includes a first face and a second face opposing the first face. The first array of bearing elements is mounted to the body and has an elliptical shape. The second array of bearing elements is mounted to the body and has an elliptical shape. A size of at least one bearing element within the first array of bearing elements of the first bearing ring is different than a size of at least one bearing element within the second array of bearing elements of the first bearing ring. In some embodiments, a size of at least one bearing element within the first array of bearing elements of the second bearing ring is different than a size of at least one bearing element within the second array of bearing elements of the second bearing ring. Each bearing element may include at least one of: polycrystalline diamond; tungsten carbide; silicon carbide; and cubic boron nitride. The first bearing ring may comprise a rotor and the second bearing ring may comprise a stator.

Another aspect of the present disclosure relates to a drilling system for use in drilling subterranean formations. The drilling system may include a motor configured to apply a torque to a rotary drill bit and being operably coupled to a bearing apparatus. The bearing apparatus may include at least one bearing ring having a body, a first array of bearing elements, and a second array of bearing elements. The body includes a first face and a second face opposing the first face. The first array of bearing elements is mounted to the body and has an elliptical shape. The second array of bearing elements is mounted to the body and has an elliptical shape. A size of at least one bearing element within the first array may be different than a size of at least another bearing element within the second array. The bearing apparatus may include a thrust bearing or a radial bearing.

A further aspect of the present disclosure relates to a bearing ring. The bearing ring includes a body and a plurality of bearing elements. The body includes a first face and a second face opposing the first face. The plurality of bearing elements includes a first array of bearing elements and a second array of bearing elements. The first array of bearing elements is mounted to the body and has an elliptical shape. The second array of bearing elements is mounted to the body and has an elliptical shape. A shape of at least one of the plurality of bearing elements may be different than a shape of at least another of the plurality of bearing elements. The elliptical shapes of the first array may be generally circular and generally concentric. Each of the bearing elements may be disposed in a bearing element pocket defined in the body. The bearing element pockets within the first array may be circumferentially evenly spaced apart from one another and bearing element pockets within the second array may be circumferentially evenly spaced apart from one another.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The instant disclosure relates generally to bearing rings, bearing apparatus, and drilling systems having bearing elements mounted thereon. As used herein, the term "bearing ring" means a bearing rotor, a bearing stator, and/or any other bearing ring suitable for use in a thrust bearing, a radial bearing, and/or any other suitable bearing apparatus. In one embodiment, a bearing ring may include bearing elements mounted to the bearing ring wherein the bearing elements are arranged in a first array and a second array of bearing elements. More particularly, the bearing elements may be arranged on the bearing ring in a first array and a second array, which are each elliptical and aligned concentrically. Such a configuration may provide a bearing apparatus having relatively small bearing elements, but having the same bearing element-to-bearing element contact area as a bearing apparatus having a single array of larger bearing elements.

One aspect of the instant disclosure relates generally to bearing rings including a body and a plurality of bearing elements mounted thereto. The plurality of bearing elements may be arranged in a first array and a second array of bearing elements. Further, the first array and the second array of bearing elements may each have a generally elliptical shape. Such a configuration may allow for the use of relatively small bearing elements, which may be easier to cool by way of, for example, cooling fluid, than larger bearing elements due to the shorter distance between the outside surfaces of the bearing elements contacted by the cooling fluid and the center of the bearing element. At the same time, the bearing element-to-bearing element contact area may not be reduced relative to a conventional bearing ring having a single array of larger bearing elements, and therefore the pressure on each bearing element may not be increased.

Figure 1:
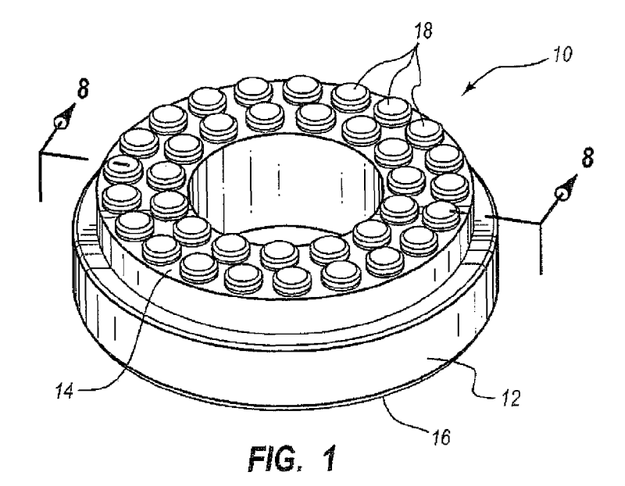
FIG. 1 shows a perspective view of a bearing ring according to one embodiment of the instant disclosure.

In one embodiment, a bearing ring may include a plurality of bearing elements mounted thereto, wherein the bearing elements are arranged in a first array and a second array. FIG. 1 shows a perspective view of a bearing ring 10 according to one embodiment of the instant disclosure. Bearing ring 10 comprises a body 12 having a first face 14, a second face 16, and a plurality of bearing elements 18 mounted thereto.

As shown in FIG. 1, body 12 may have an annular shape. However, the shape of body 12 is not limited and may include other shapes, such as a cylinder or a cube. The material of body 12 is also not limited and may include any suitable material for use in a bearing ring, such as a metal alloy. The size (e.g., inner diameter, outer diameter, thickness, etc.) of the body is not limited and may be scaled up or down for a variety of uses and applications.

A plurality of bearing elements 18 arranged in a first array and a second array may be mounted on first face 14 of body 12. Such mounting may take place via any suitable means for securing bearing elements 18 to body 12. For example, bearing elements 18 may be soldered to first face 14 of body 12, bearing elements 18 may be adhered to first face 14 of body 12 using a suitable braze material, bearing elements 18 may be press fit into body 12, or bearing elements 18 may be affixed to first face 14 of body 12 using a mechanical fastener (e.g., a screw) or secured in any other suitable manner.

The material of bearing elements 18 is not limited and may represent any suitable bearing element material. In one aspect of the instant disclosure, bearing elements 18 may comprise a material selected from the group comprising polycrystalline diamond (PCD), tungsten carbide, silicon carbide, cubic boron nitride, and composites thereof. In another aspect of the instant disclosure, bearing elements 18 may include contact surfaces comprising PCD.

Figure 2A:
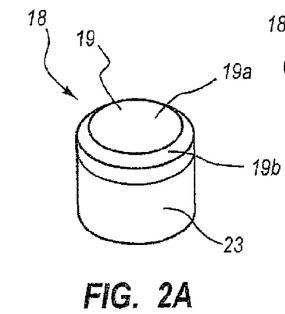
FIG. 2A shows a perspective view of a bearing element according to one embodiment.
Figure 2B:
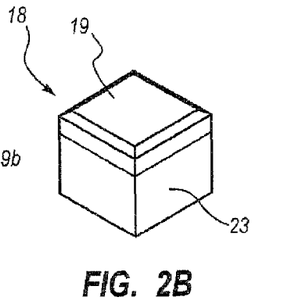
FIG. 2B shows a perspective view of a bearing element according to an additional embodiment.
Figure 2C:
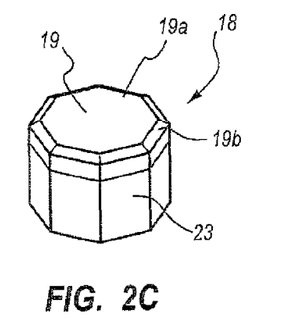
FIG. 2C shows a perspective view of a bearing element according to an additional embodiment.

The cross-sectional shape of bearing elements 18 is also not limited. For example, bearing elements 18 may be in the shape of a cylinder (including a regular cylinder, an elliptic cylinder, etc.), a cube, a cuboid, or a polyhedron. FIGS. 2A, 2B, and 2C illustrate several different bearing elements 18 having various shapes. In FIG. 2A, bearing element 18 is in the shape of a cylinder. In FIG. 2B, bearing element 18 is in the shape of a cuboid. In FIG. 2C, bearing element 18 is in the shape of a polyhedron having an octagonal horizontal cross-section. As illustrated in each of FIGS. 2A, 2B, and 2C, an end 19 of bearing elements 18 may comprise a flat portion 19a and a beveled portion 19b. End 19 of bearing element 18 may be the end of bearing element 18 that extends away from body 12 of bearing ring 10 and which comes into contact with bearing elements of another bearing ring.

As further illustrated in FIGS. 2A-2C, bearing element 18 may additionally comprise a substrate 23. A superhard material (e.g., polycrystalline diamond, cubic boron nitride, silicon carbide, or any other suitable superhard material, as described above) may be bonded to substrate 23. A superhard material bonded to substrate 23 may provide a bearing surface (e.g., end 19 of bearing element 18) that is relatively wear resistant. In at least one embodiment, substrate 23 may comprise a carbide material, such as cobalt sintered tungsten carbide. Additionally, bearing element 18 may include a catalyst (e.g., cobalt, nickel, iron, or any other suitable catalyst) to facilitate formation of polycrystalline diamond on substrate 23. Optionally, at least a portion of a catalyst within bearing element 18 may at least partially be removed using any suitable method, such as, for example, by acid leaching.

As with the size of body 12, the size of bearing elements 18 is not limited and may be selected depending on the application of bearing ring 10. Furthermore, as described in greater detail below, different bearing elements 18 mounted on a body 12 of a bearing ring 10 may be of various sizes. For example, at least some of bearing elements 12 may be the same size or may be different sizes. As also noted above, the plurality of bearing elements 18 mounted on body 12 of bearing ring 10 may be arranged in a first array and a second array. The shape of the arrays of bearing elements 18 may be generally elliptical. As used herein, the phrase "elliptical" means any type of ellipse, circle, oval, elongated oval, or a substantially similar shape. The generally elliptical shaped first array and second array of bearing elements 18 may be concentrically arranged on body 12 of bearing ring 10 or may be oriented about different center points. In the example shown in FIG. 1, the first array and the second array of bearing elements 18 are substantially concentric circles.

Because a first array and a second array of bearing elements 18 may be utilized, bearing elements 18 may be smaller relative to bearing elements used in a conventional, single-array bearing apparatus. The smaller bearing elements may be easier to cool via cooling fluid due to the short distance between the outer edges of the bearing elements that are most concurrently contacted by the cooling fluid and the center of the bearing elements. Optionally, the same or a similar bearing element-to-bearing element contact area may be maintained as compared to a conventional single-array bearing apparatus due to the first array and the second array of bearing elements, such that pressure exerted on each bearing element may not be increased.

Figure 3:
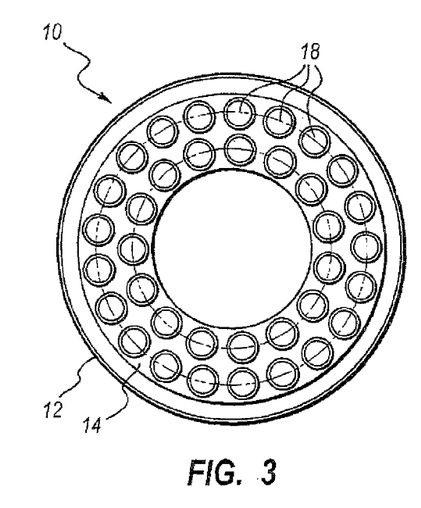
FIG. 3 shows a top elevational view of a bearing ring according to one aspect of the instant disclosure.
Figure 4:
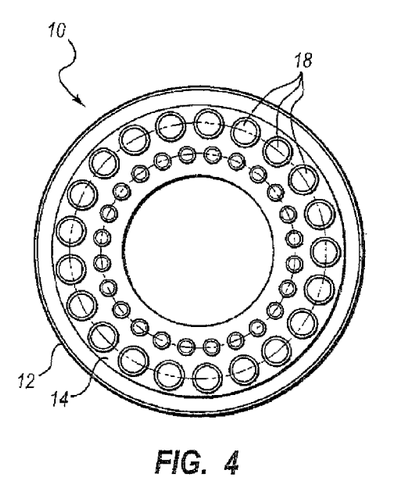
FIG. 4 shows a top elevational view of a bearing ring according to one aspect of the instant disclosure.
Figure 5:
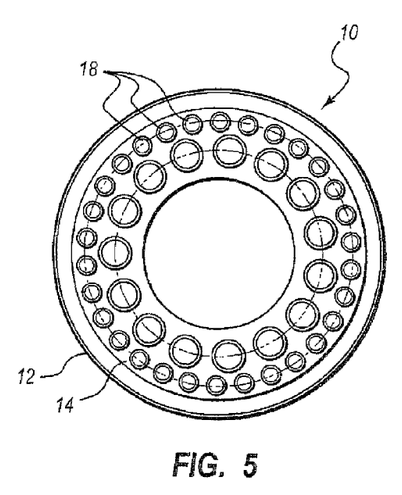
FIG. 5 shows a top elevational view of a bearing ring according to one aspect of the instant disclosure.

FIGS. 3-6 illustrate various configurations of arrays of bearing elements mounted on a body of a bearing ring contemplated in the instant disclosure. In FIGS. 3-6, bearing ring 10 includes two arrays of bearing elements 18 arranged in a series of substantially concentric circles. In FIG. 3, bearing ring 10 includes two arrays of generally cylindrically shaped bearing elements 18 wherein the diameter of each of bearing elements 18 is approximately the same. FIGS. 3-5 illustrate that the size of bearing elements 18 mounted on bearing ring 10 may be the same from the first array to the second array or may vary from the first array to the second array. In FIG. 4, bearing ring 10 includes two arrays of generally cylindrically shaped bearing elements 18 wherein the diameter of each bearing element 18 within the same array is approximately the same, but wherein the diameter of bearing elements 18 within an array decreases from the radially outermost array to the radially innermost array. In FIG. 5, bearing ring 10 includes two arrays of cylindrically shaped bearing elements 18 wherein the diameter of each bearing element 18 within the same array is approximately the same, but wherein the diameter of bearing elements 18 within an array increases from the radially outermost array to the radially innermost array. In each of FIGS. 3-5, bearing elements 18 within an array may be evenly circumferentially spaced apart from each other.

In other arrangements, the size of each bearing element within an array may vary. Furthermore, while FIGS. 3-5 each illustrate arrays of bearing elements all having approximately the same shape within a given array, the shape of the bearing elements may vary within an array or between arrays. Similarly, while FIGS. 3-5 each illustrate arrays of bearing elements all having approximately the same contact area (i.e., the area of the end of bearing elements extending out of bearing element pockets), the contact area of the bearing elements may vary within an array or between arrays.

Figure 6:
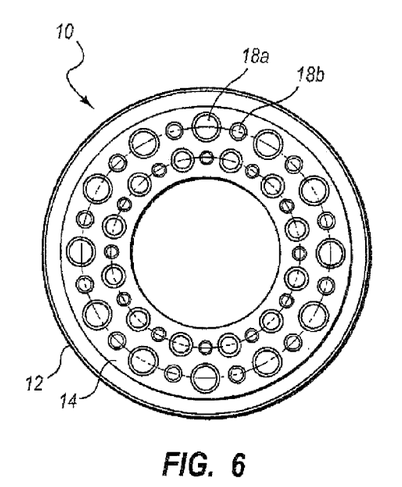
FIG. 6 shows a top elevational view of a bearing ring according one aspect of the instant disclosure.

For example, as illustrated in FIG. 6, the size of bearing elements mounted on bearing ring 10 may vary within an array. In at least one embodiment, as shown in FIG. 6, bearing ring 10 may include two arrays of generally cylindrically shaped bearing elements, wherein the diameter of bearing elements 18a and bearing elements 18b may vary within an array. For example, bearing elements 18a may have a larger diameter than bearing elements 18b in a single array. Additionally, bearing elements 18a may alternate with bearing elements 18b within an array. Bearing elements 18a and bearing elements 18b may also be evenly circumferentially spaced apart from each other in an array.

Figure 7:
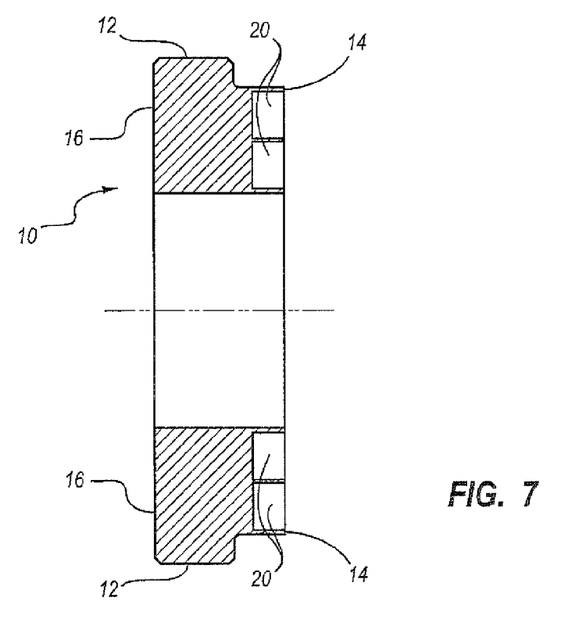
FIG. 7 shows a side cross-sectional view of a bearing ring according to the instant disclosure.
Figure 8:
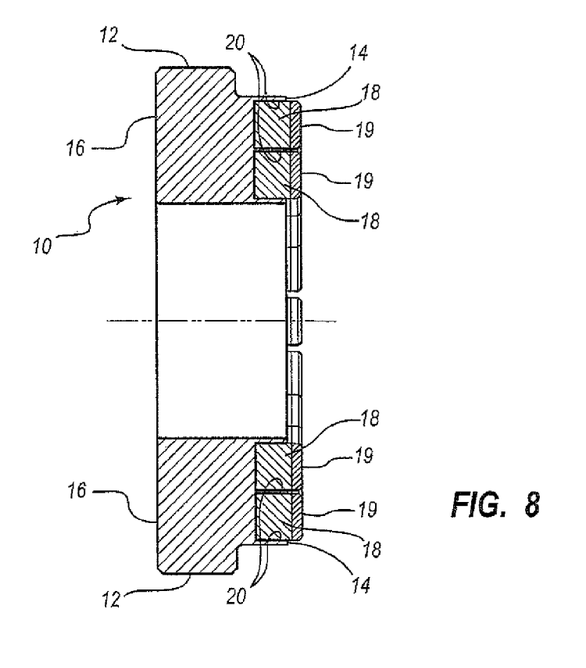
FIG. 8 shows a side cross-sectional view of a bearing ring according to the instant disclosure.

In at least one embodiment, bearing elements 18 may be in bearing element pockets 20 located in body 12, as shown in FIGS. 7 and 8. FIG. 7 is a side cross-sectional view of bearing ring 10 shown in FIG. 1, taken along line 8-8 with bearing elements 18 removed, and illustrates bearing element pockets 20 in greater detail. As can be seen, bearing element pockets 20 may extend into body 12 from first face 14. As shown in FIG. 7, bearing element pockets 20 may not extend from first face 14 to second face 16 of body 12. In other embodiments of bearing ring 10, bearing element pockets 20 may extend through body 12 of bearing ring 10.

FIG. 8 is a side cross-sectional view of bearing ring 10 shown in FIG. 1, taken along line 8-8. As shown in FIG. 8, each of bearing elements 18 may be disposed in an associated bearing element pocket 20 located in body 12 of bearing ring 10. In one embodiment, the shape of bearing element pocket 20 may be similar to the shape of bearing element 18. For example, when using a cylindrically shaped bearing element, bearing element pocket 20 may have a generally cylindrical shape.

In one embodiment, each of bearing elements 18 may be disposed within its respective bearing element pocket 20 and then secured within its respective bearing element pocket 20. The method for securing bearing element 18 in bearing element pocket 20 is not limited and may include, for example, brazing (i.e., high temperature soldering), soldering, mechanical mechanisms such as screws, and interference (i.e., selecting the size of the bearing element pocket to the size of the bearing element such that the bearing element fits tightly in the bearing element pocket and cannot be easily removed from the bearing element pocket). A manner for securing bearing element 18 in bearing element pocket 20 by interference is illustrated in FIG. 8. As illustrated in this figure, the outer diameter of cylindrically shaped bearing element 18 may exceed the diameter of cylindrically shaped bearing element pocket 20 such that bearing element 18 fits tightly in bearing element pocket 20. Such a configuration may limit or prevent bearing element 18 from rotating within bearing element pocket 20 after having been secured in bearing element pocket 20.

In one aspect illustrated in FIG. 8, the height of bearing elements 18 may be greater than the depth of bearing element pocket 20 into which each bearing element 18 is positioned. In this manner, end 19 of bearing element 18 may protrude above first face 14 of body 12. In an alternate aspect where the height of bearing element 18 is not greater than the depth of bearing element pocket 20, bearing element 18 may still be oriented in bearing element pocket 20 such that end 19 protrudes above first face 14 of body 12. In one aspect of the instant disclosure, at least a portion of end 19 of bearing element 18 protruding out of bearing element pocket 20 may be substantially parallel to first surface 14 of body 12. In another embodiment, each bearing element 18 mounted to body 12 of bearing ring 10 may protrude out of body 12 to substantially the same distance away from first surface 14 such that ends 19 of each bearing element 18 are substantially coplanar.

Figure 9:
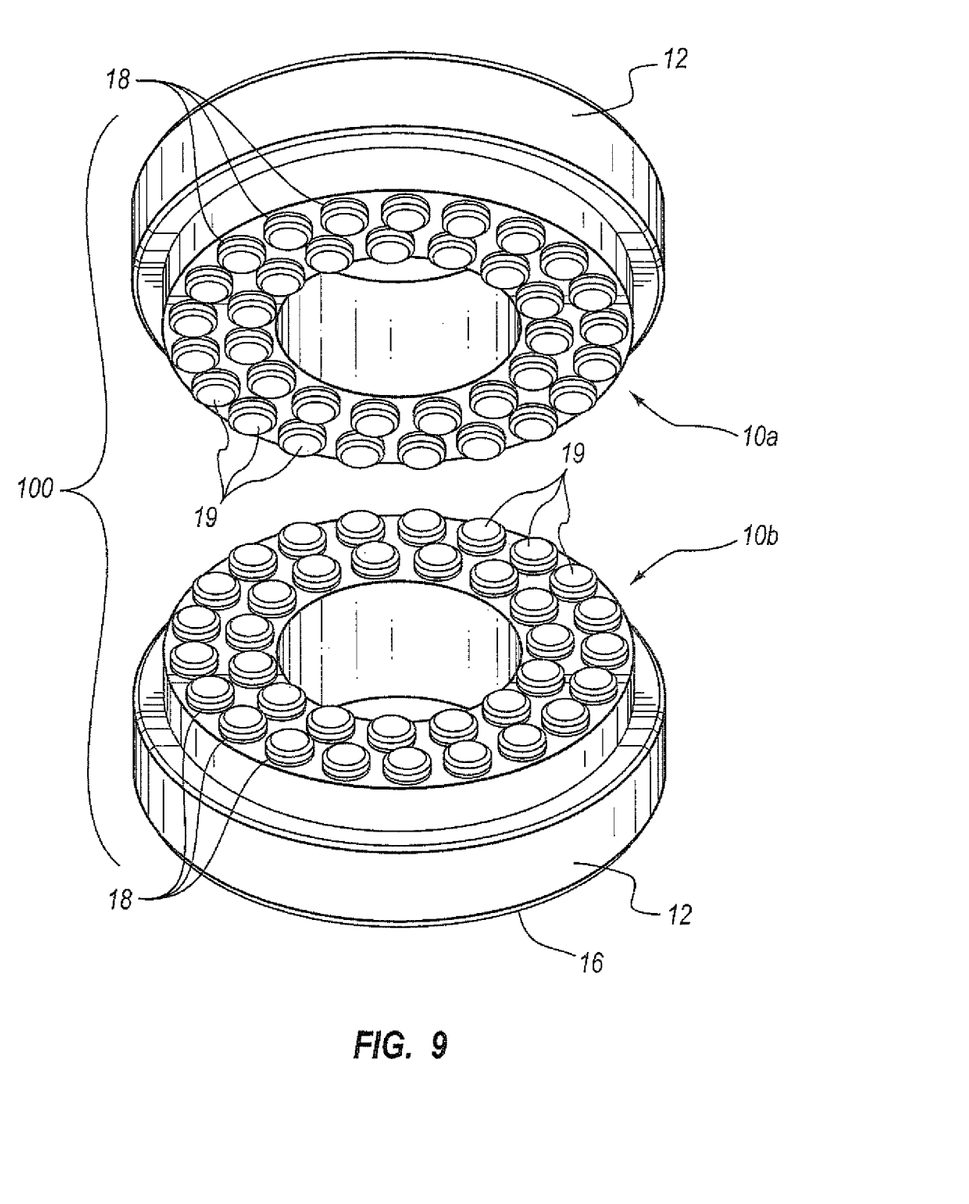
FIG. 9 shows a perspective view of a bearing apparatus according to the instant disclosure including a first bearing ring and a second bearing ring.

From the foregoing description, it may be appreciated that at least one bearing ring according to any of the embodiments described above may be used to form a bearing apparatus. For example, FIG. 9 shows a perspective view of a thrust bearing apparatus 100 including a first bearing ring 10a and a second bearing ring 10b. During use, first bearing ring 10a and second bearing ring 10b may be aligned with one another and ends 19 of bearing elements 18 mounted to bearing ring 10a may be in contact with ends 19 of bearing elements 18 mounted to bearing ring 10b. First bearing ring 10a and second bearing ring 10b may also be affixed to a system to provide a thrust bearing structure. It should also be appreciated that, in operation, first bearing ring 10a may rotate while second bearing ring 10b may remain stationary, or vice versa. In one embodiment, bearing rings 10a and 10b may be substantially identical (e.g., both bearing rings may have the same number of arrays, the same number of bearing elements within each array, bearing elements having the same shape and size, etc.). In another embodiment, bearing rings 10a and 10b are not identical (e.g., the first bearing ring and the second bearing ring may have different numbers of bearing elements, different sizes of bearing elements, etc.).

Figure 10:
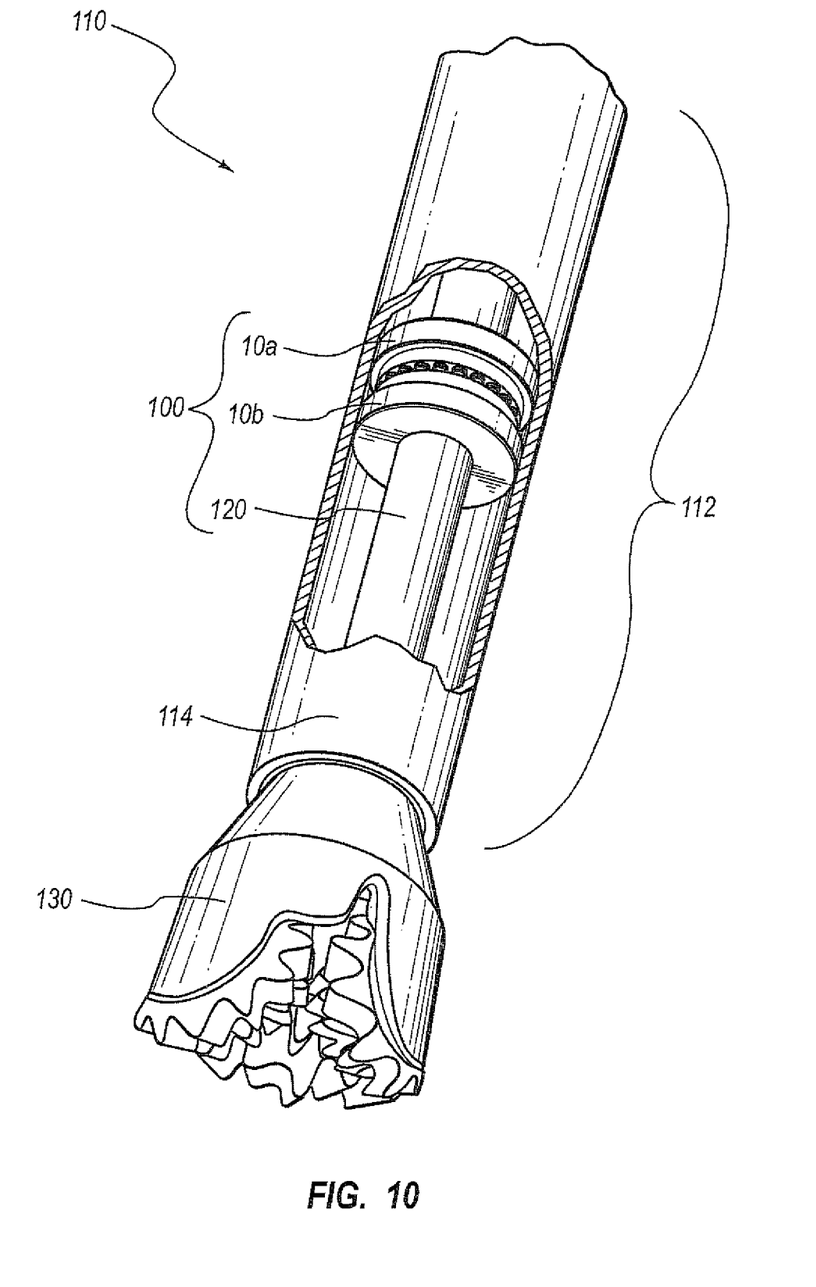
FIG. 10 shows a perspective view of a subterranean drilling system including a bearing apparatus according to the instant disclosure.

Thrust bearing apparatus 100 disclosed above may also be incorporated into a mechanical system. For example, FIG. 10 shows a perspective view of a subterranean drilling system 110 incorporating thrust bearing apparatus 100. In particular, as known in the art, a rotary drill bit 130 may be rotated by downhole drilling motor assembly 112. Downhole drilling motor assembly 112 may be located at the end of a series of pipe sections comprising a drill string. The housing 114 of downhole drilling motor assembly 112 remains stationary as rotary drill bit 130 rotates.

In further detail, output shaft 120 of downhole drilling motor assembly 112 may be coupled to rotary drill bit 130 and drilling fluid (i.e., drilling mud) may cause torque to be applied to output shaft 120 and rotary drill bit 130. Rotary drill bit 130 is shown as a so-called roller cone type bit including roller cones, but may be a fixed cutter (e.g., a drill bit including a polycrystalline diamond cutting elements or compacts) or any other rotary drill bit or drilling tool (e.g., a reamer, impregnated diamond drill bit, core bit, etc.) as known in the art, without limitation. As shown in FIG. 10, thrust bearing apparatus 100 comprising first bearing ring 10a and second bearing ring 10b may be operably assembled to downhole drilling assembly 112, as known in the art.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

For example, although the bearing rings described above have been discussed in the context of down-hole drilling tools, it should be understood that such bearing rings are not limited to such use and could be used within a bearing apparatus or system for varied applications, if desired, without limitation. Thus, such apparatus and systems are not limited to use with down-hole drilling tools and may be used with various other mechanical systems, without limitation.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:
1. A bearing ring comprising:
a body including a first face and a second face opposing the first face;
a plurality of bearing elements comprising:
a first array of bearing elements mounted to the body, wherein each bearing element of the first array of bearing elements is substantially centered along a common radial arc such that the first array of bearing elements exhibits a substantially circular shape;
wherein the first array of bearing elements is substantially equally, circumferentially spaced and wherein the first array of bearing elements includes a repeating pattern of bearing elements exhibiting at least two different diameters.

2. The bearing ring of claim 1, wherein the repeating pattern of bearing elements includes a repeating pattern of a bearing element exhibiting a first diameter circumferentially adjacent a bearing element exhibiting a second diameter.

3. The bearing ring of claim 1, wherein each bearing element comprises at least one of: polycrystalline diamond; tungsten carbide; silicon carbide; and cubic boron nitride.

4. The bearing ring of claim 1, wherein each bearing element comprises polycrystalline diamond compact.

5. The bearing ring of claim 1, wherein the plurality of bearing elements further comprises a second array of bearing elements mounted to the body.

6. The bearing ring of claim 5, wherein each of the bearing elements is disposed in a bearing element pocket defined in the body.

7. The bearing ring of claim 6, wherein each bearing element of the first array and each bearing element of the second array has a generally cylindrical shape, wherein each bearing element pocket has a generally cylindrical shape with a diameter that exceeds a diameter of each bearing element disposed therein.

8. The bearing ring of claim 6, wherein the bearing elements within the second array are circumferentially evenly spaced apart from one another and wherein the second array includes a repeating pattern of bearing elements exhibiting at least two different diameters.

9. The bearing ring of claim 6, wherein each bearing element comprises a top end that extends out of the bearing element pocket into which it is disposed, wherein the top end is beveled.

10. A bearing apparatus comprising:
a first bearing ring, the first bearing ring comprising:
a first body including a first face and a second face opposing the first face;
a first array of bearing elements mounted to the first body, wherein the first array of bearing elements includes at least two differently sized bearing elements, each bearing element of the first array of bearing elements being substantially centered along a common radial arc such that the first array of bearing elements mounted to the body of the first bearing ring exhibits a substantially circular shape, and wherein the first array of bearing elements mounted to the body of the first bearing ring includes a repeating pattern of bearing elements exhibiting at least two different diameters; and
a second bearing ring, the second bearing ring comprising:
a second body including a first face and a second face opposing the first face;
a first array of bearing elements mounted to the second body including at least two differently sized bearing elements.

11. The bearing apparatus of claim 10, wherein each bearing element comprises at least one of: polycrystalline diamond; tungsten carbide; silicon carbide; and cubic boron nitride.

12. The bearing apparatus of claim 10, wherein the first bearing ring comprises a rotor and wherein the second bearing ring comprises a stator.

13. The bearing apparatus of claim 10, wherein:
each bearing element of the first array of bearing elements mounted to the body of the second bearing ring is substantially centered along a common radial arc such that the first array of bearing elements mounted to the body of the second bearing ring exhibits a substantially circular shape; and
the first array of bearing elements mounted to the body of the second bearing ring includes a repeating pattern of bearing elements exhibiting at least two different diameters.

14. A drilling system for use in drilling subterranean formations, the drilling system comprising:
a motor configured to apply a torque to a rotary drill bit, the motor operably coupled to a bearing apparatus;
wherein the bearing apparatus comprises:
at least one bearing ring comprising:
a body including a first face and a second face opposing the first face;
a first array of bearing elements mounted to the body, wherein each bearing element of the first array of bearing elements is substantially centered along a common radial arc such that the first array of bearing elements exhibits a substantially circular shape; and
wherein the first array of bearing elements is substantially equally, circumferentially spaced and wherein the first array of bearing elements includes a repeating pattern of bearing elements exhibiting at least two different diameters.

15. The drilling system of claim 14, wherein the bearing apparatus comprises a thrust bearing or a radial bearing.

16. The drilling system of claim 14, further comprising a second array of bearing elements mounted to the body.

17. The drilling system of claim 16, wherein the bearing elements of the second array are circumferentially evenly spaced apart from one another and wherein the second array of bearing elements includes a repeating pattern of bearing elements exhibiting at least two different diameters.

18. The drilling system of claim 16, wherein each of the bearing elements is disposed in a bearing element pocket defined in the body.

* * * * *